US005160609A

United States Patent [19]

Van Der Herberg

[11] Patent Number: 5,160,609

[45] Date of Patent: Nov. 3, 1992

[54] CENTRIFUGAL SEPARATOR WITH DISCHARGE OF SEPARATED CONSTITUENTS BY BRAKING MOMENT

[76] Inventor: Jan W. Van Der Herberg, De Wiekslag 28, Heerenveen, Netherlands, 8446 KT

[21] Appl. No.: 575,423

[22] Filed: Aug. 30, 1990

[51] Int. Cl.5 .................... B01D 17/038; B01D 17/12; B04B 9/02; B04B 11/02

[52] U.S. Cl. .................................. 210/143; 210/368; 210/512.1; 494/2; 494/5; 494/7; 494/11; 494/26; 494/56; 494/84

[58] Field of Search ............... 210/138, 139, 143, 145, 210/403, 512.1, 368-377, 147; 318/280, 283; 494/211, 23, 26, 42, 50, 56, 60, 65, 84, 5, 7

[56] References Cited

U.S. PATENT DOCUMENTS

| | | | |
|---|---|---|---|
| 1,303,203 | 5/1916 | Hughes et al. | 494/50 |
| 1,882,389 | 10/1932 | MacIsaac | 494/11 |
| 3,167,509 | 1/1965 | Steinacker | 494/11 |
| 3,403,848 | 10/1968 | Windsor et al. | 494/11 |
| 3,648,926 | 3/1972 | Pause | 494/26 |
| 3,861,584 | 1/1975 | Dudrey | 494/11 |
| 3,931,928 | 1/1976 | Kido | 494/84 |
| 3,990,631 | 11/1976 | Schall | 494/84 |
| 4,008,856 | 2/1977 | Sears | 241/79.1 |
| 4,155,503 | 5/1979 | Sears | 494/84 |
| 4,406,651 | 9/1983 | Dudrey et al. | 494/29 |

FOREIGN PATENT DOCUMENTS

| | | | |
|---|---|---|---|
| 1062633 | 7/1959 | Fed. Rep. of Germany | 494/11 |
| 3542134 | 6/1987 | Fed. Rep. of Germany | 494/11 |
| 331822 | 3/1973 | U.S.S.R. | 494/26 |
| 2116752 | 6/1989 | United Kingdom | 494/11 |

*Primary Examiner*—Robert A. Dawson
*Assistant Examiner*—Joseph Drodge
*Attorney, Agent, or Firm*—Wegner, Cantor, Mueller & Player

[57] ABSTRACT

A separator comprises a frame supporting a closed cylindrical drum, a motor for rotating the drum about a central, longitudinal axis, an inlet through which a liquid from which constituents are to be separated is introduced into the drum, and an outlet through which relatively clean liquid is dischargeable from the drum. During the separating process, centrifugal force causes a layer of the heavier constituents to collect on the interior surface of the drum, displacing the relatively clean liquid into an annular layer situated concentrically with and between the constituent layer and the entering volume of liquid, such that the contents of the annular layer is separately dischargeable from the drum in a continuous manner. In order to discharge the collected constituents from the drum, the inlet and outlet are closed and the motor is controlled to impart a braking moment on the rotating drum and thus cause churning of the liquid remaining in the drum so as to aid in removing the collected constituents from the inner surface of the drum and, thereafter, a valve is actuated to discharge the remaining contents from the drum.

14 Claims, 7 Drawing Sheets

CENTRIFUGAL SEPARATOR WITH DISCHARGE OF SEPARATED CONSTITUENTS BY BRAKING MOMENT

The invention relates to the separating of fine, light waste from processing liquid that is released in large quantities. What can be understood hereby are for instance waste washing water in the potato processing industry, slaughterhouses or textile die works. Such processing liquids containing fine, light waste can in principle be cleaned using filters. These become rapidly blocked, however, so that they have to be frequently changed, which means much extra work. As a result filters are expensive and inconvenient to use.

In practice, no good, economically usable technique has been found to be available for cleaning such processing liquid. This is therefore normally discharged onto the surface water. This solution is not a cheap one either, since discharge of such contaminated liquid entails high environmental levies.

In the light of the above the invention has for its object to provide an effective device that is economically viable in operation for separating fine, light waste from processing liquid.

The first step towards achieving this object lies in the choice of the type of device. According to the invention the starting point is a tube separator that is per se known, although not for this intended purpose. Such a separator comprises a frame, a closed cylindrical drum mounted on the frame for rotation about a centre line, drive means for feeding into the interior of the drum a liquid containing constituents for separating, and discharge means for discharging relatively clean liquid out of the interior of the drum from a determined radial distance from the centre line. Such a separator is generally used for separating relatively small amounts of bulky waste. After a time the separator is stopped, disassembled and the separated constituents are scraped out of the drum. Such a known separator is therefore not suitable for continuous processing of a large liquid waste flow with a comparatively large amount of waste.

With the separator according to the invention this is however possible as a result of braking means coupled to the drum for exerting a braking moment on the rotating drum and switchable second discharge means for discharging constituents separated from the liquid out of the interior of the drum. It is namely possible through this step to remove the separated waste from the drum without disassembling it. When after an empirically determined period of time such an amount of waste has been deposited in the drum that it becomes "full", the feed means for the contaminated liquid and the discharge means for the relatively clean liquid are closed and the braking means are set into operation. Because of the sluggishness of the liquid still present in the drum very strong eddies occur which loosen the deposited dirt. The loosened dirt can be discharged with the remaining liquid via the second discharge means. Hereafter the separator is brought up to speed again and the feed means for the contaminated liquid are switched on again so that a following cycle can begin. Any residual waste remaining behind in the drum is once again directly separated off against the inner periphery of the drum so that relatively clean liquid again comes directly out of the discharge means. The control of this cycle can very suitably be automated so that the device according to the invention can function without the direct supervision of an operative. The device according to the invention has the additional advantage that it occupies very little space. A realized embodiment of the separator according to the invention having a vertically disposed drum can process up to 12 $m^3$ of waste water per hour and only occupies therein a floor surface area of less than 2 $m^2$.

A favourable further development of the invention is obtained because the drive means comprise a motor reversible in drive rotation direction and the braking means are formed by the drive means, wherein the braking moment can be generated by reversing the drive rotation direction of the motor. By generating the braking moment using the drive motor, no mechanical friction and attendant wear occurs when the drum is braked. The thus embodied separator according to the invention hereby requires little maintenance.

The additional advantage of the use of a controlled electrical DC-motor is that herewith is also achieved the possibility of varying the speed of revolution of the separator in simple manner. For example, the separator can operate under determined conditions with a lower speed of revolution. Slow acceleration and deceleration are other possibilities.

A favourable further development of the separator according to the invention is characterized by providing the drum internally with press-off means for pressing a deposit of separated constituents off the inner wall. Particularly in those cases when the separator according to the invention is used for separating constituents which form a closed, smooth layer against the inner wall of the drum is this further development favourable.

A simple but very effective embodiment of this further development uses compression. During emptying of the separator compressed air is blown via the compressed air channels behind the deposit of separated constituents, whereby this comes loose from the inner wall and is picked up well in the eddying washing water and can be discharged therewith. During operation of the separator according to a further development of this embodiment the constituents for separating are deposited against the lining of flexible material. During emptying of the separator, medium under pressure is carried via the medium feed means behind the lining, whereby this is "inflated" toward the inside. Even when the waste forms a dense, solid layer it is broken loose in very reliable manner and carried away by the eddying liquid. During "inflation" of the lining there in fact occurs a length enlargement in axial direction and a length reduction in radial direction. A deposited, dense and smooth layer will on the one hand split and on the other hand be rolled up so that the layer comes loose of the lining and can be discharged in simple manner.

When a reservoir for air under pressure is employed with this embodiment the extra energy consumption can be very greatly restricted. The pressure in the reservoir is kept lower than the pressure that is applied by the liquid in the tube separator as a consequence of the centrifugal force at the normal rotation speed of the separator. The lining thus remains lying against the inner wall of the separator. When the braking means are set into operation and the rotation speed of the drum therefore decreases, the pressure exerted on the lining by the centrifugal force likewise decreases to a value below that of the compressed air in the reservoir. The compressed air can thereby flow out of the reservoir behind the lining and "inflate" it. When the drum is again brought up to operating speed the lining will again be pressed against the inner wall of the drum by the pressure resulting from the centrifugal force, wherein the air is forced back to the reservoir. The feed and discharge of the medium under pressure therefore costs no additional energy.

According to a further development , air under pressure is used on the one hand for pressing the loosened dir:·out of the separator to the outside. On the other hand, by feeding air under pressure into the drum during operation of the separator, and by adjusting the pressure thereof to a desired value, the thickness of the layer of liquid against the drum wall can be set at the desired value. Partly hereby the conditions in the separator can be adjusted such that optimum conditions are created for a particular liquid composition.

The possibilities for cleaning the drum achieved through the braking means can be further enhanced. By feeding for example clean water under pressure via the spray orifices the inner wall of the drum can be additionally spray cleaned.

The central stationary tube can be used simultaneously for feeding the liquid for cleaning into the interior of the drum.

A further development provides for opening at choice either the spray orifices or the outflow openings.

By briefly engaging the DC-motor in successively driving and braking sense, churning loose of the separated constituents can be performed a number of times consecutively. Also when the separated material forms a dense, closed layer on the inside of the drum, this material can still be discharged in reliable manner from the drum after a separating cycle.

The device according to the invention will be further elucidated in the following description with reference to drawings of an embodiment thereof.

Figure 1:
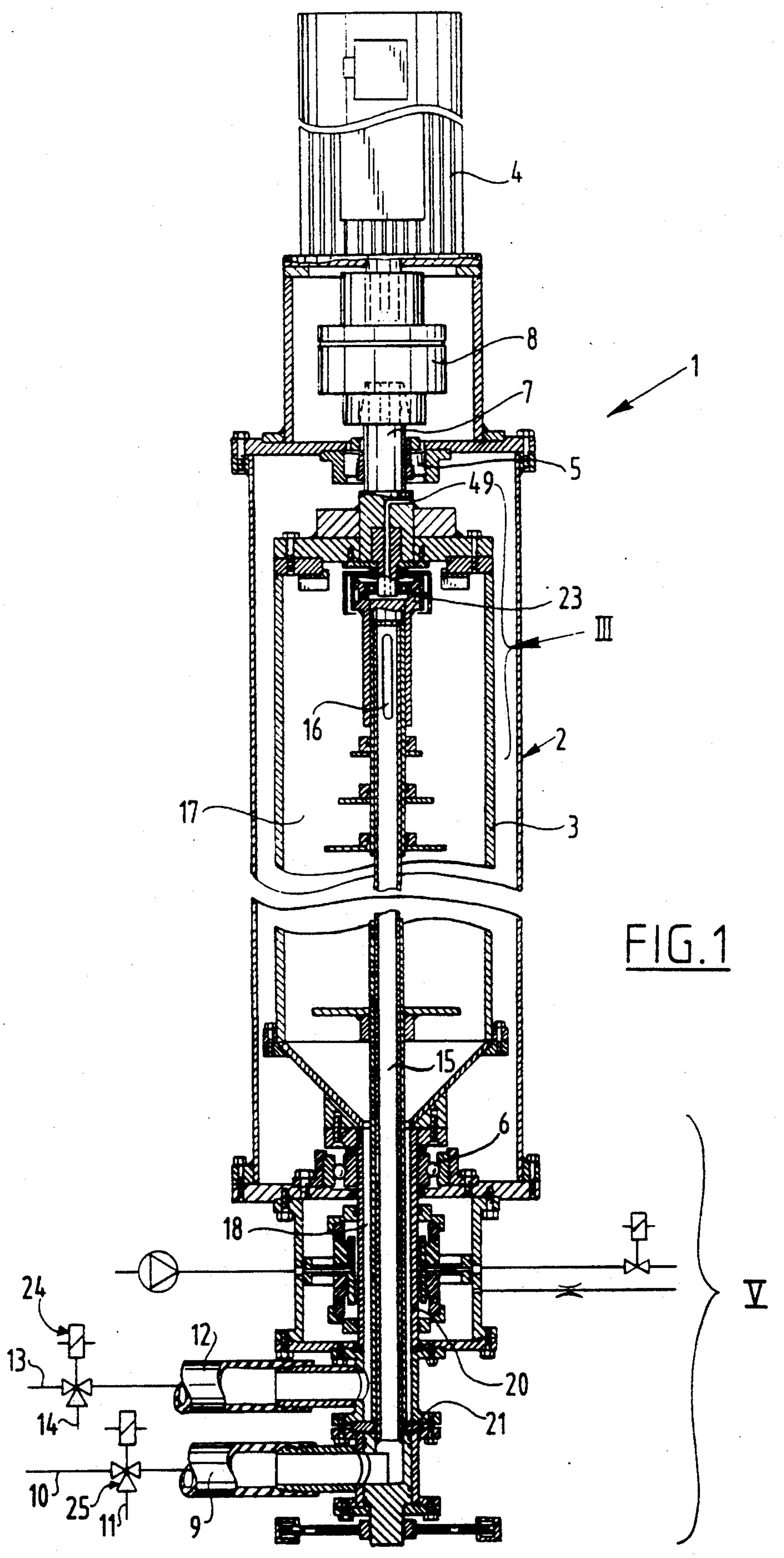
FIG. 1 shows a lengthwise section of an embodiment of a separator according to the invention.

The separator 1 according to the invention shown in FIG. 1 comprises a tubular frame 2 wherein a drum 3 is rotatably mounted. At its top end the drum 3 bears a shaft 7 which is mounted in a bearing 5 fitted on the frame 2, and on its bottom end the drum 3 bears a shaft pipe 20 which is mounted in a bearing 6 fitted on the frame 2. The shaft 7 of the separator drum 3 is coupled by means of a coupling 8 to a controlled electrical DC-motor 4. The motor 4 can therefore drive the separator drum 3 rotatably.

Figure 3:
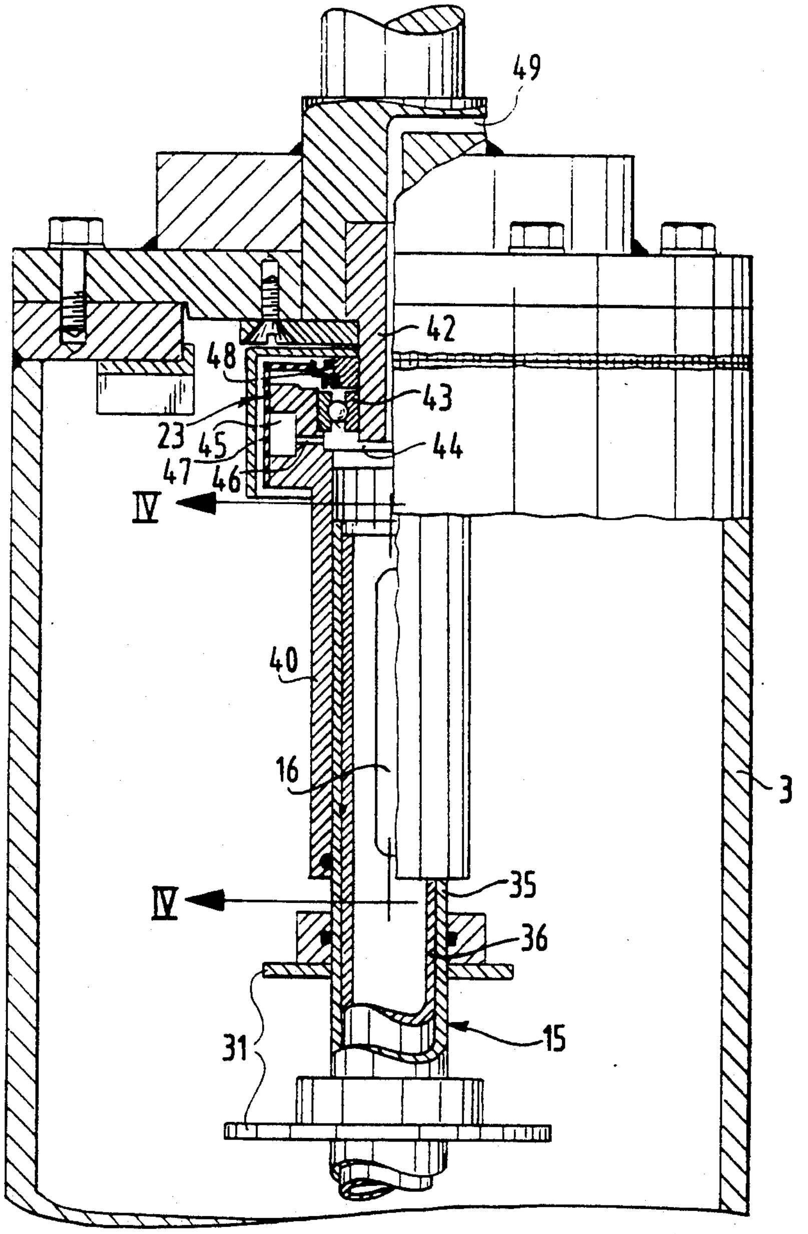
FIG. 3 shows on a larger scale the detail indicated with arrow III in FIG. 1.

Mounted coaxially in the interior of the drum 3 is a stationary tube 15. This tube 15 has a double-walled form for reasons to be described later and is clamped in at its bottom end using a flange 21 in a portion of the frame housing 2. At its top end the stationary tube 15 is bearing mounted relative to the drum 3 by a bearing construction 23 to be further described hereinafter with reference to FIG. 3.

Connected at the bottom of the central tube 15 is a feed 9 through which a liquid containing constituents for separation which is supplied via the schematically designated conduit 10 is carried into the interior of the separator drum 3. The stationary tube 15 comprises to this end a feed opening 16.

Between the stationary tube 15 and the shaft pipe 20 is formed a channel 18 of annular section which connects the inner space 17 of the drum to a discharge connection 12. Connected to this discharge connection are first discharge means 13 for relatively clean liquid and discharge means 14 for separated dirt. The choice of connection of the discharge 12 to one of the discharge means 13, 14 is adjusted using an electrically operated valve 24. In similar manner, which of the feed lines 10, 11 is connected to the feed 9 is determined using a valve 25.

Figure 2:
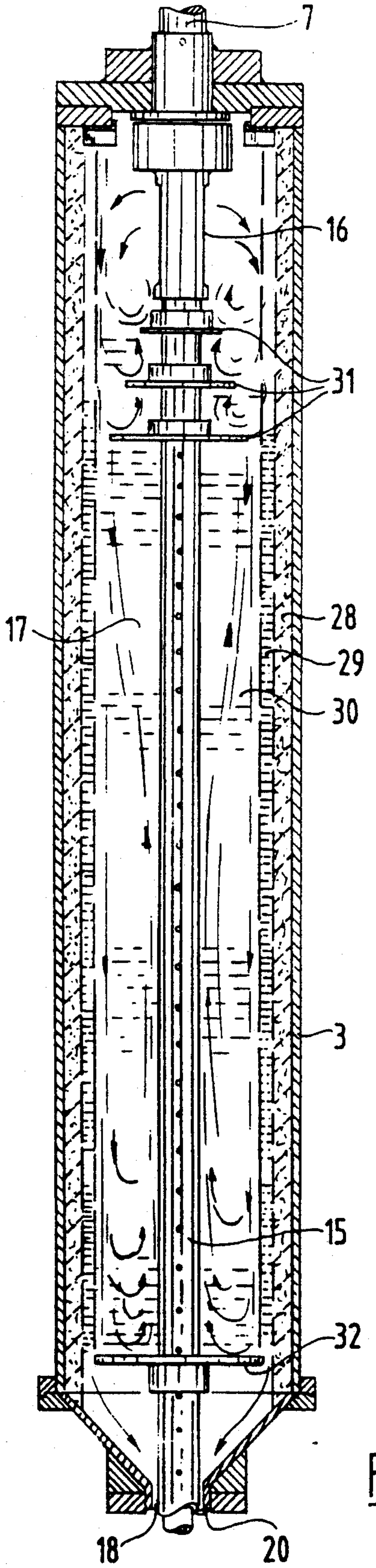
FIG. 2 shows a lengthwise section of a portion of the separator of FIG. 1 in the position of use.

With reference to FIG. 2 the operation of the device is made clear.

The liquid containing constituents for separation is carried through the feed openings 16 in the stationary tube 15 into the interior 17 of the rotating separator drum 3. As remarked earlier the device is particularly suitable for separating fine, light waste out of a processing liquid. This liquid can be for example washing water of a potato processing plant or a slaughterhouse. The liquid fed into the inside space 17 of the drum is separated under the influence of the generated centrifugal forces into a layer 28 of heavy material directly against the inner wall of the drum, a layer 30 of light material located closest to the centre of the drum, and a layer 29 of clean liquid. Arranged in the bottom of the drum 3 on the stationary tube 15 is an outlet disc 32 which ensures that the light impurities 30 remain enclosed in the drum and the clean liquid 29 can escape via the annular channel 18 towards the discharge means. The diameter of the disc 32 is adapted to the specific composition of the processing liquid for treatment.

The central tube 15 also bears a number of discs 31 at the top. These ensure that the liquid coming out of the outflow opening 1 to the outside is constrained in certain manner to a relatively large diameter and is thereby directly carried away by the already rapidly rotating liquid. These discs 31 are also adapted to the specific composition of the liquid for treatment.

It can namely be desired that the liquid is taken up as quickly as possible in the rotating liquid mass, that is, in the direct vicinity of the outflow opening 16. This will be the case particularly when the contaminated liquid contains constituents difficult to separate. It is then desirable that the separator is maximally operative over the greatest possible length. In that case it is also possible to arrange directly around the central tube 15 close to the outflow opening 16 a tube casing which is provided for instance with blades and which rotates with the drum 3. The outflowing liquid is then set directly into rotation.

When the contaminated liquid contains more easily separated constituents, for example slightly granular material with a greater density than the transporting liquid, it may be desired to set the contaminated liquid into rotation in a gentler manner over a greater length of the separator drum. Otherwise a comparatively large quantity of the heavier material for separation would be deposited in the immediate vicinity of the outflow openings 16 and the separator would become "full" more quickly. By setting the liquid into rotation uniformly over a greater length the depositing of these constituents is spread over a greater length.

Substantially two areas are created in the interior of the drum 3, that is, the area above the discs 31 and the area between the discs 31 and the outlet disc 32. In the area above the discs 31 the supplied liquid is set into rotation and little separation as yet takes place due to the eddies occurring therein. In the space between the discs 31 and the outlet disc 32 the flow conditions are markedly gentler and a good separation can therefore take place. As is indicated with the arrows, circulation flows result from the braking brought about by the outlet disc 32 which contribute to separation occurring uniformly over the whole length of the drum 3.

Air under pressure can be carried into the drum 3 via the described air feed means 11. This air forms a column round the central tube 15. By feeding the air at a higher pressure the thickness of the column increases and the thickness of the liquid layer therefore decreases. The inflow conditions and the conditions under which separation takes place thereby alter and can be hereby adapted to the specific composition of the contaminated liquid. After a period of time, depending on the degree of contamination of the liquid and the quantity of through-fed liquid, so much separated heavy material 28 and light material 30 will be situated in the drum 3 that the drum will have to be emptied. The "cleaning phase" begins with the closing of the valves 24 and 25. The separator drum 3 is subsequently braked, in the case of the embodiment described here by causing the controlled DC-motor 4 to apply a braking torque. The liquid in the separator drum 3 is brought hereby into strong eddying and churns loose the deposited heavy material 28. The material present in the drum 3 is hereby well intermixed. After the separator drum 3 has come to a stop, the valve 24 is switched such that the discharge 12 comes into communication with the dirt discharge 14. The valve 25 is simultaneously operated such that the air feed 11 is placed in communication with the feed 9. As a result of the supplied air under pressure the mixture of liquid and separated material present in the drum 3 is pressed out of the drum 3 to the dirt discharge 14. When the composition of the material for separation is such that the layer of deposited heavy material 28 is strongly cohesive, the drum 3 can once again be brought up to speed and braked one or more times prior to emptying by appropriate control of the DC-motor 4. With a suitable embodiment of the control device for the motor 4 this operation can be performed automatically in simple manner.

As soon as the drum 3 has been pressed empty, the drum is once again set into rotation, the valve 24 is closed and the valve 25 is reversed such that the feed line 10 for contaminated liquid is brought into communication with the feed 9 of the device. When sufficient liquid has been fed into the drum 3, the valve 24 is actuated in order to connect the discharge line 13 for cleaned liquid to the discharge 12 of the device.

Figure 4:
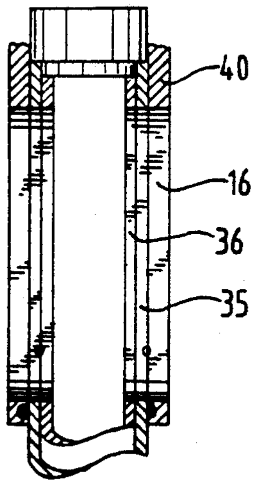
FIG. 4 shows a section along IV—IV in FIG. 3.
Figure 5:
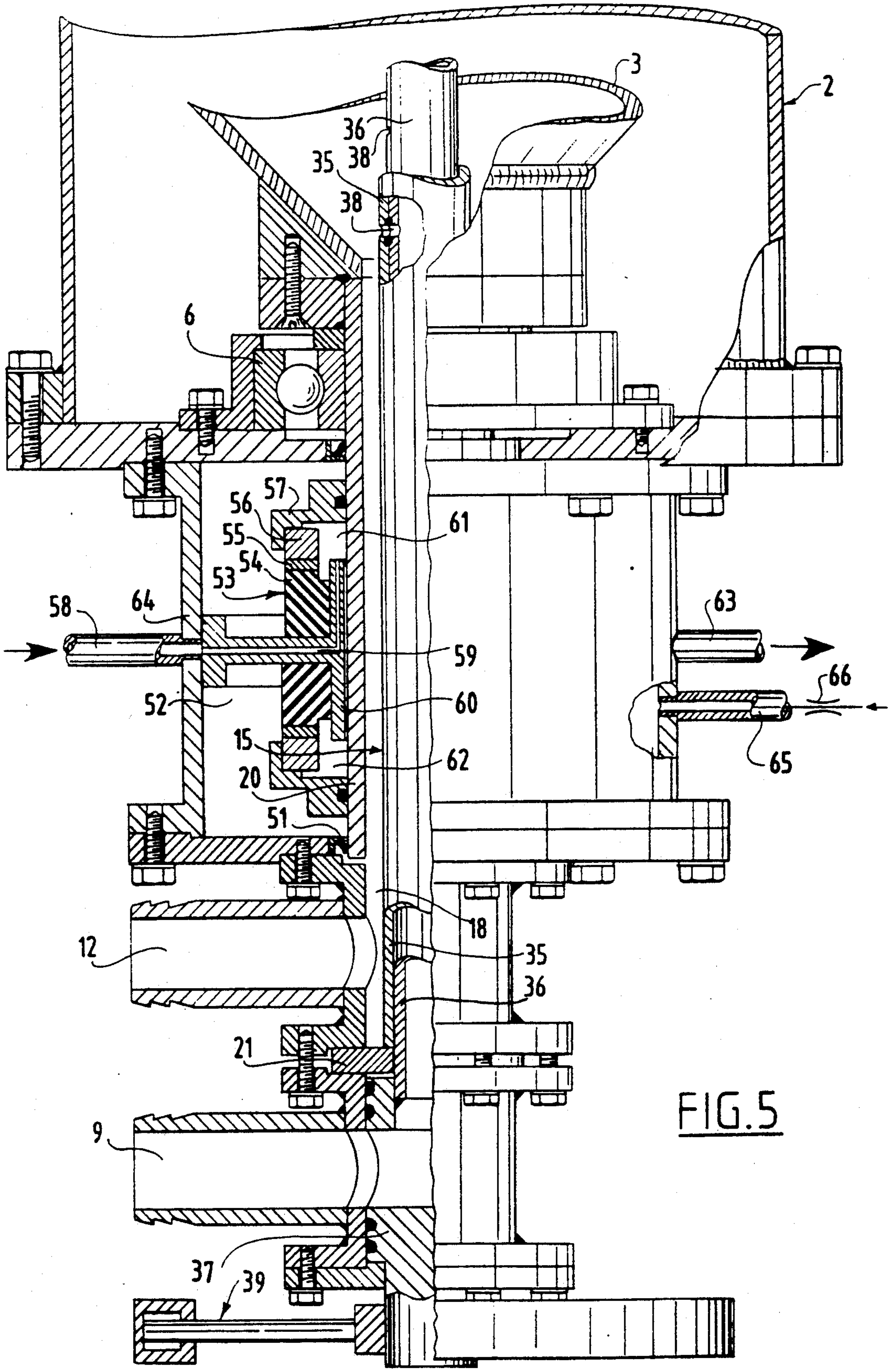
FIG. 5 shows on a larger scale a detail of the device as designated with V in FIG. 1.

For optional additional loosening of the deposited heavier constituents from the wall of the drum 3 spray orifices 38 are arranged in the peripheral wall of the stationary tube 15. Liquid under pressure, for instance mains water or waste water when it does not contain any coarse constituents, can be sprayed with force through these orifices onto the inner wall of the drum in order to spray loose the solid constituents. 10 As is shown specifically in FIG. 3–5, the stationary tube 15 is assembled from an outer tube 35 and an inner tube 36. The outer tube 35 bears on its bottom end the flange 21 which is fixedly clamped into portions of the frame housing 2. The inner tube 36 is rotatable in the outer tube 35. On its bottom end the inner tube 36 bears a socket coupling 37 comprising a connecting opening to the feed 9. The socket coupling 37 protrudes at the lower end outside the frame housing 2 and a moving device 39, not shown in detail and operating for instance with an air cylinder, grips thereon. With this moving device 39 the inner tube 36 can be moved for instance a quarter turn in the outer tube 35. The spray orifices 38 and the outflow openings 16 are arranged in the inner tube and the outer tube such that in the one extreme rotated position of the inner tube 36 the spray orifices 38 lie in one line and the outflow openings 16 are closed, while in the other extreme rotated position the outflow openings 16 are open and the spray orifice 38 are closed. Through being able in this manner to close the outflow opening 16 for spray cleaning of the inner wall of the drum a high pressure can be generated in the inner tube whereby the liquid can spray outward with great force from the spray orifices 38. On the upper end of the outer tube 35 is mounted a sleeve 40. Between the top end of the sleeve 40 and a shaft end part 42 forming an entity with the separator drum 3 is mounted a bearing 43. The stationary tube 15 is hereby supported in stable manner in the rotating drum 3.

During operation of the separator the liquid containing the impurities is situated in the immediate vicinity of the bearing construction 23. The separator can therein work under high pressure so that the bearing construction 23 is in danger of becoming contaminated. To counter this danger a per se normal sealing ring 48 is arranged which prevents direct penetration of dirt into the bearing 43. Turned in the periphery of the sleeve 40 is a chamber 45 which is in communication via one or more channels 46 with the central chamber 44 which has direct connection to the bearing 43 and via this to the sealing ring 48. Arranged around the outside of the sleeve 40 at the location of the chamber 45 is a ring of elastic material 47 which closes off the chamber 45 like a membrane. Oil can be pressed via a filling channel 49 leading to the outside into the chamber 44 and herefrom into the chamber 45. The oil penetrates via the bearing 43 to the sealing ring 48 and, when an overpressure has been reached, the excess oil passes through the sealing ring 48. When the bearing construction 23 thus entirely filled with oil is exposed on the outside to contaminated liquid under high pressure, the pressure of this liquid is transmitted via the elastic member 47 onto the liquid in the bearing construction 23. The same pressure will hereby always prevail on either side of the sealing ring 48, thus preventing contaminated liquid under high pressure passing through the sealing ring 48 and entering the bearing 23. It is only necessary from time to time during a normal maintenance service to press some oil into the line 49 in order to ensure that the bearing construction 23 remains functioning perfectly.

Because of the high pressures and the high rotation speed at which the separator according to the invention can operate, great demands are also made of the sealing construction on the underside. In the embodiment shown use is therefore made of per se known ceramic sealings 53. For reasons that will become apparent two of these ceramic sealing constructions 53 are employed, one of which will be described. Fitted in the portion of the frame housing 2 containing the sealing is a transverse partition wall 64, on either side whereof an elastic ring 54 is fitted. A carbon ring 55 is fixedly connected to the elastic ring 54 on a radial surface thereof. Connected to this carbon ring 55 is a surface of a stainless steel ring 56 provided with a hard metal wear layer. This ring 56 is mounted on the shaft pipe 20 using a mounting ring 57. When drum 3 rotates the stainless steel ring 56 therefore turns relative to the carbon ring 55. The carbon ring 55 is pressed with a determined force against the stainless steel ring 56 as a result of the elasticity of the elastic ring 54. This contact pressure has a value such that a sealing is formed for a pressure difference between the inside and outside of the ring. The friction causes heat, however, and provisions are therefore made for cooling the ceramic sealings 53. A cooling water feed line 58 communicates via a channel 59 with the chamber 61 on the radial inner side of the sealing. Via the channel 60 of annular section between the cylindrical portion of the partition wall 64 and the shaft pipe 20 the cooling water likewise penetrates into the chamber 62 on the radial inner side of the lower sealing construction. Arranged on the opposite side of the housing is a cooling water discharge 63 which, in a manner similar to the feed, communicates with the chambers 61 and 62. The cooling water is supplied at a pressure which at its lowest is equal to the pressure in the annular channel 18. A corresponding pressure is hereby developed in the chamber 52. Against the bottom end of the shaft pipe 20 lies a sealing ring 51, the sealing lip whereof lies with only a very small pressure against the shaft pipe 20. Use can for instance be made of a normal oil catcher from which the spring has been removed. This sealing ring 51 has only to prevent dirt penetrating into the chamber 52 several times. Additionally, an air feed 65 is connected to the chamber 52. Air under comparatively high pressure is fed in this manner into the chamber 52 via a strong restriction 66. The volume flow is very limited so that during normal operation no high pressure builds up in the chamber 52. However, as soon as the sealing ring becomes dirty and thereby make difficult or impossible the discharge of cooling water that has entered the chamber 52, the pressure in the chamber 52 gradually increases to the pressure of the supplied air. Any dirt that has accumulated in the catcher 51 is hereby pressed together with cooling water that ha entered the chamber 52 into the channel 18 and in this way discharged via the discharge 12.

Figure 6:
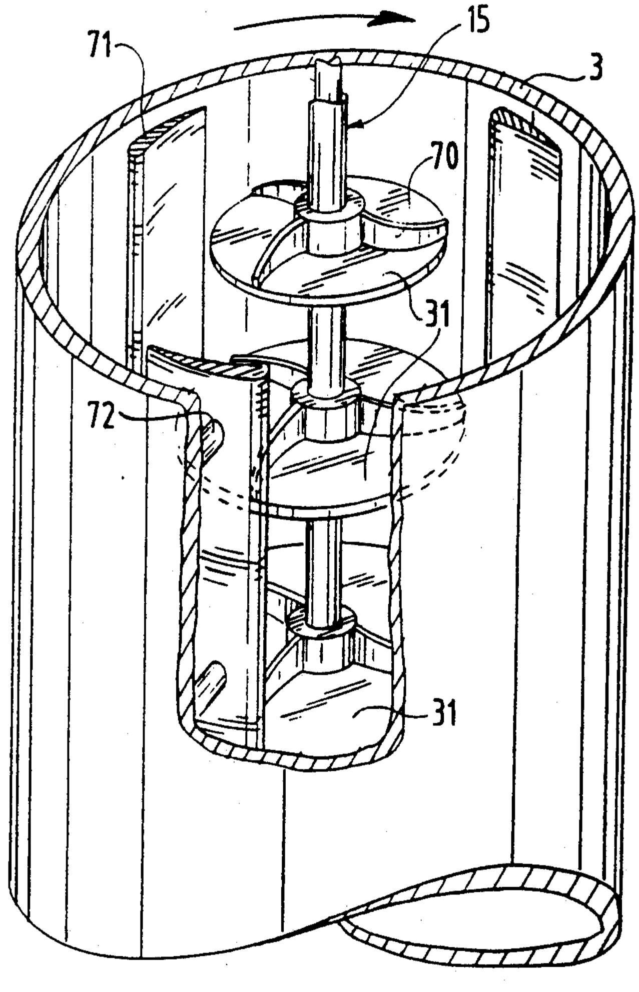
FIG. 6 is a partly sectional perspective view of a separator drum of another embodiment of the device according to the invention.

FIG. 6 shows a partially cut through perspective view of a further developed embodiment. The above mentioned discs 31 are provided herein with blades 70 which reinforce the braking action on the rotating liquid and thereby the circuit flows indicated with arrows in FIG. 2.

A number of strips 71 with a wing profile are further mounted against the inner wall of the separator drum 3. The strips 71 are fitted with supports 72 at a certain distance from the wall of the separator drum 3. As shown, the strips 71 are positioned at a small angle relative to the wall of the drum 3 such that the passage opening is narrowed in the rotational direction of the drum. As soon as the drum 3 is braked for the emptying cycle the liquid present will begin to rotate with respect to the drum 3 and, each time the liquid passes between a strip 71 and the drum wall 3, will be accelerated. The material accumulated on the wall is hereby washed loose with force. Through the differences in speed resulting from the strips 71 the turbulence is furthermore intensified.

Figure 7:
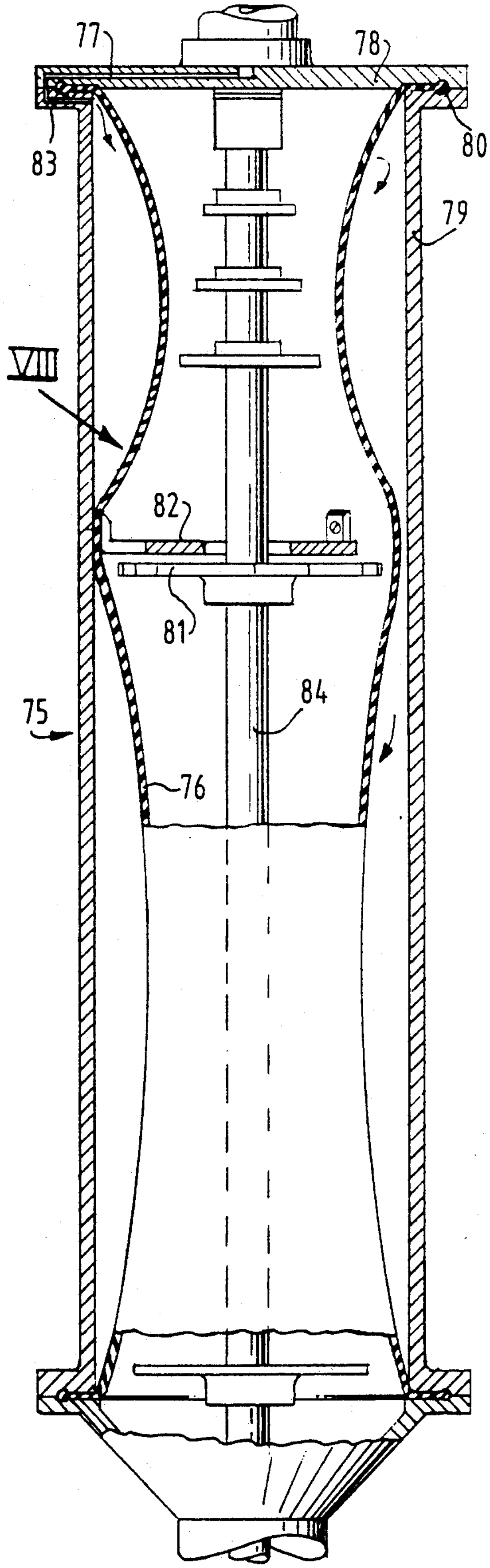
FIG. 7 shows a lengthwise section of a separator drum according to yet another embodiment of the invention.
Figure 8:
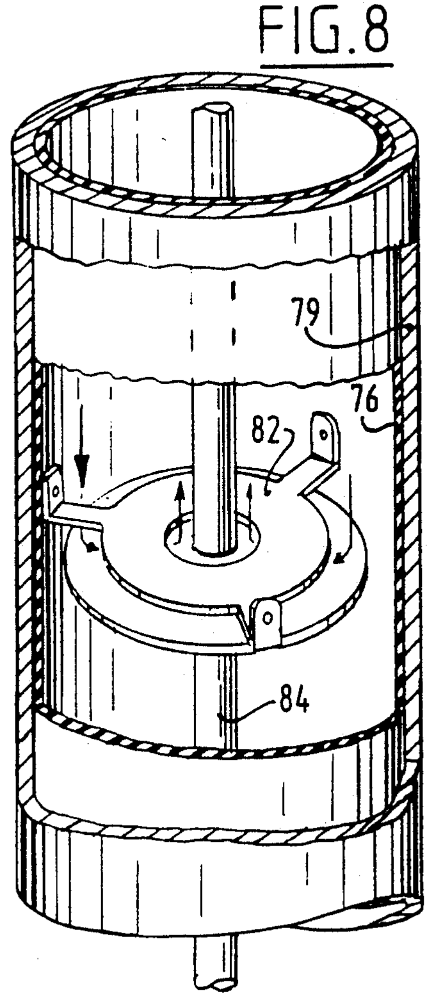
FIG. 8 is a broken away perspective detail view along arrow VIII in FIG. 7.

In accordance with a very favourable further development of the invention the drum 75 shown in FIG. 7 has a lining 76 of flexible material, for instance synthetic rubber. This lining 76 is provided on its top and bottom end with a flange 77 with a beaded edge 80 which is sealingly enclosed between the upper wall 78 and the drum wall 79. Debouching behind the lining 76 is a channel 83 through which medium under pressure can be supplied. When medium under pressure is supplied via channel 83 the lining 76 obtains the "inflated" form shown in FIG. 7. FIG. 8 shows the lining in the situation during normal operation of the separator, that is, when the drum 75 rotates at a relatively high speed. In this situation the lining 76 lies against the inner wall of the drum 75.

The medium under pressure is fed via the channel 83 during emptying of the drum, that is, during discharge therefrom of the deposited waste. The waste materials deposited as a layer on the lining 76 are broken away from the lining through "inflating" thereof, even when they form a dense and smooth layer. During "inflation" the lining 76 stretches in axial direction, while it is compressed in the radial peripheral direction. The layer of deposited material, which is not flexible, is hereby broken loose in certain manner from the lining 76 and can be further discharged in the previously described manner.

Close to a fixed disc 81 arranged on a central pipe 84 a holding element 82 can be fitted on the drum wall 79 which, as is made clear in FIG. 7, prevents the lining 76 being able to come into contact with this disc 81. The holding element 82 can as FIG. 8 shows be embodied as a disc with a central opening which co-acts with the fixed disc 81 for partial enclosing of contaminated liquid supplied at the top. Between the fixed disc 81 and the disc 82 rotating therewith the liquid is slowed down s that it will flow from outside radially to the inside as indicated with the arrows.

Figure 9:
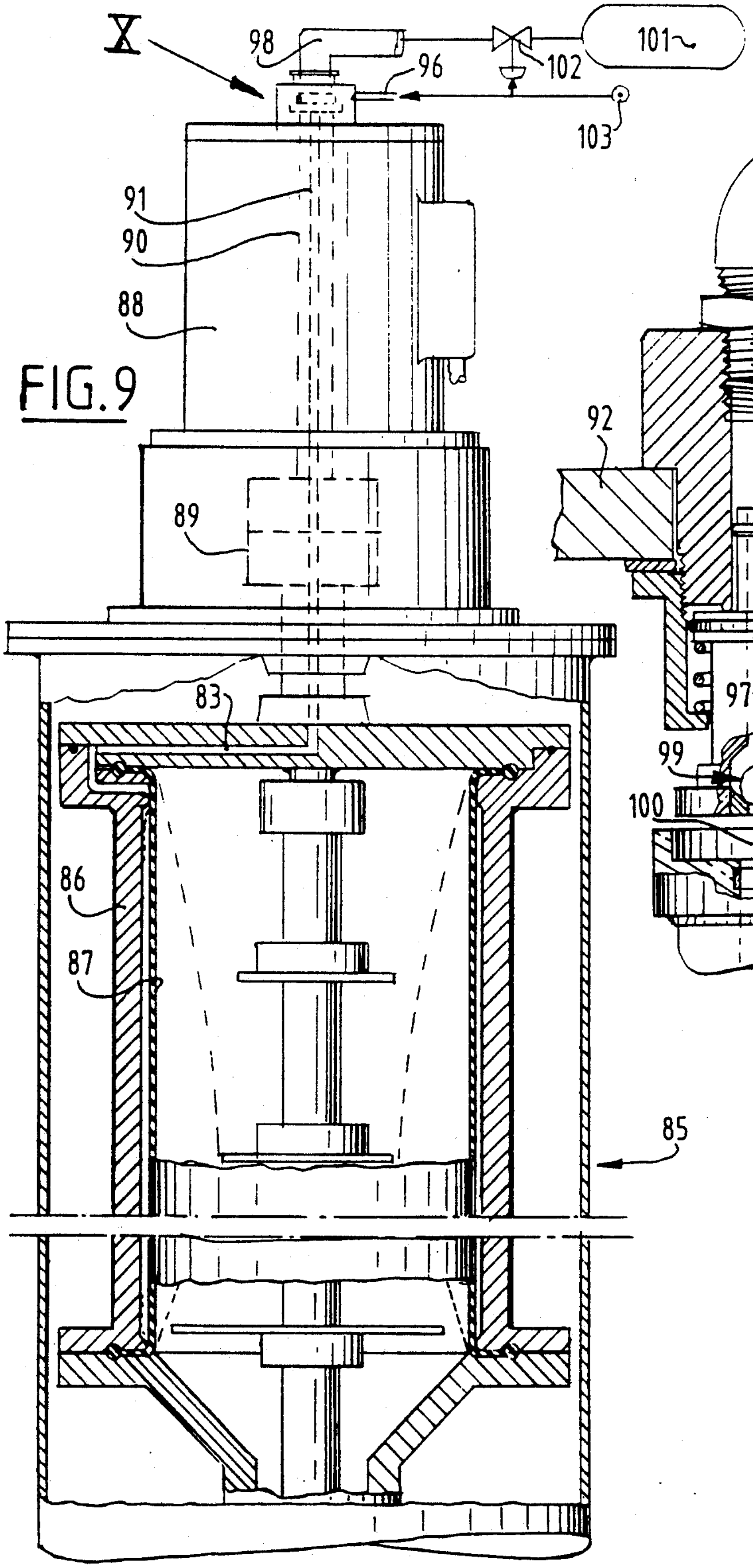
FIG. 9 shows a separator according to the invention partly in section as elucidation of the operation of the drum as in FIG. 7 and 8.

FIG. 9 shows a separator 85 in the drum 86 of which is fitted a lining 87 of flexible material in the manner of FIG. 7. The drum 86 is driven in the previously described manner by an electromotor 88. The drum 86 is connected to the motor shaft 90 via a coupling 89.

The channel 83 that comes out behind the lining 87 communicates with a central channel 91 which extends through the shaft of the drum 86, the coupling 89 and the motor shaft 90 itself. The through-connection of the pipe 91 at the location of the coupling 89 can be carried out in a manner evident to a person skilled in the art.

The means for feeding medium under pressure behind the lining 87 further comprise a reservoir 101 wherein the medium, for instance air, is held under a determined pressure. This pressure is lower than the pressure exerted by the liquid for cleaning on the lining 87 during the normal operation of the separator as a consequence of the centrifugal force. The reservoir 101 is connected via a control valve 102 to a feed connection 98 fitted on a cylinder housing 93 that is fixedly connected to the housing 92 of the motor. In the cylinder housing 93 is formed a cylinder wherein a piston 94 is slidably arranged. This piston 94 is constrained upward by a spring 105. The piston 94 can be constrained downward counter to the force of the spring 105 by admitting medium, for example air under pressure, via the control channel 96 into the space 95 above the piston 94. Arranged in the piston 94 is a central channel 97 that is in communication with the feed 98. A non-return valve 99 is fitted in the bottom of the piston 94. The piston 94 bears on its bottom end a first portion of a ceramic sealing 104 which co-acts with a second portion of this sealing that is fixedly connected to the motor shaft 90.

Figure 10:
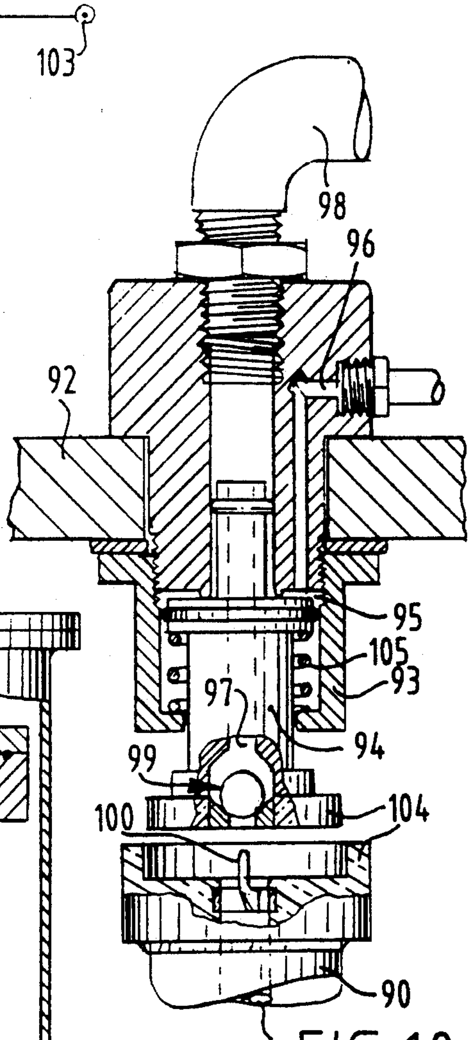
FIG. 10 shows a detail view in section according to arrow X in FIG. 9.

FIG. 10 indicates the position of the medium feed means in the situation where the drum 86 of the separator 85 rotates in the usual manner at relatively high speed for separating finely distributed impurities out of a supplied liquid waste. As shown in FIG. 10, the two portions of the ceramic sealing 104 are not in contact with one another so that wear is prevented. During the emptying cycle a control pressure is supplied from the schematically designated source 103 which opens the valve 102 and applies pressure above the piston 94 whereby this piston 94 moves downward until the portions of the ceramic sealing 104 are pressed sealingly into mutual contact. Via the opened valve 102 medium, for instance air, can flow under pressure out of the reservoir 101 to the feed 98 and via the channel 97 to a point close to the non-return valve 99. When the ceramic sealing 104 is almost entirely closed, the ball of the non-return valve 99 comes into contact with a protrusion 100, whereby the ball is lifted from its seat and free communication occurs between the channel 97 in the piston 94 and the channel 91 in the motor shaft 90. In this way the medium under pressure can therefore flow behind the lining 87. When the speed of rotation of the drum 86 has been so lowered by the braking means set into operation that the pressure exerted on the lining 87 as a result of the centrifugal force falls below the pressure of the medium in reservoir 101, the lining 87 will be "inflated" and the layer of deposit broken loose if it has not yet already been released by the eddying action of the liquid in the drum 86. When the waste material breaks loose from the lining 87 it is taken up into the liquid and can be further discharged in the previously described manner.

After the loosening action described here has ended, the drum 86 is brought once again up to the normal speed of revolution and the feed for contaminated liquid is again opened. As a consequence of the centrifugal force this liquid exerts in the drum 86 a pressure on the lining 87 such that this is pressed back against the wall of the drum 86. Herein the medium is pressed back into the reservoir 101. When the drum 86 is at full speed and the medium wholly pressed out the control pressure from the source 103 is removed, whereby the piston 94 moves upward. The non-return valve 99 closes so that no medium can escape in undesired manner. Only leakage losses occurring during switching of the piston 94 have to be compensated from time to time. Virtually no energy is therefore required for "inflation" of the lining 87.

Instead of the embodiment with a reservoir 101, medium under pressure can of course also be supplied directly from a source. Regulation of the control pressure from the source 103 is preferably likewise performed by the control device which controls the operation of the whole separator.

Figure 11:
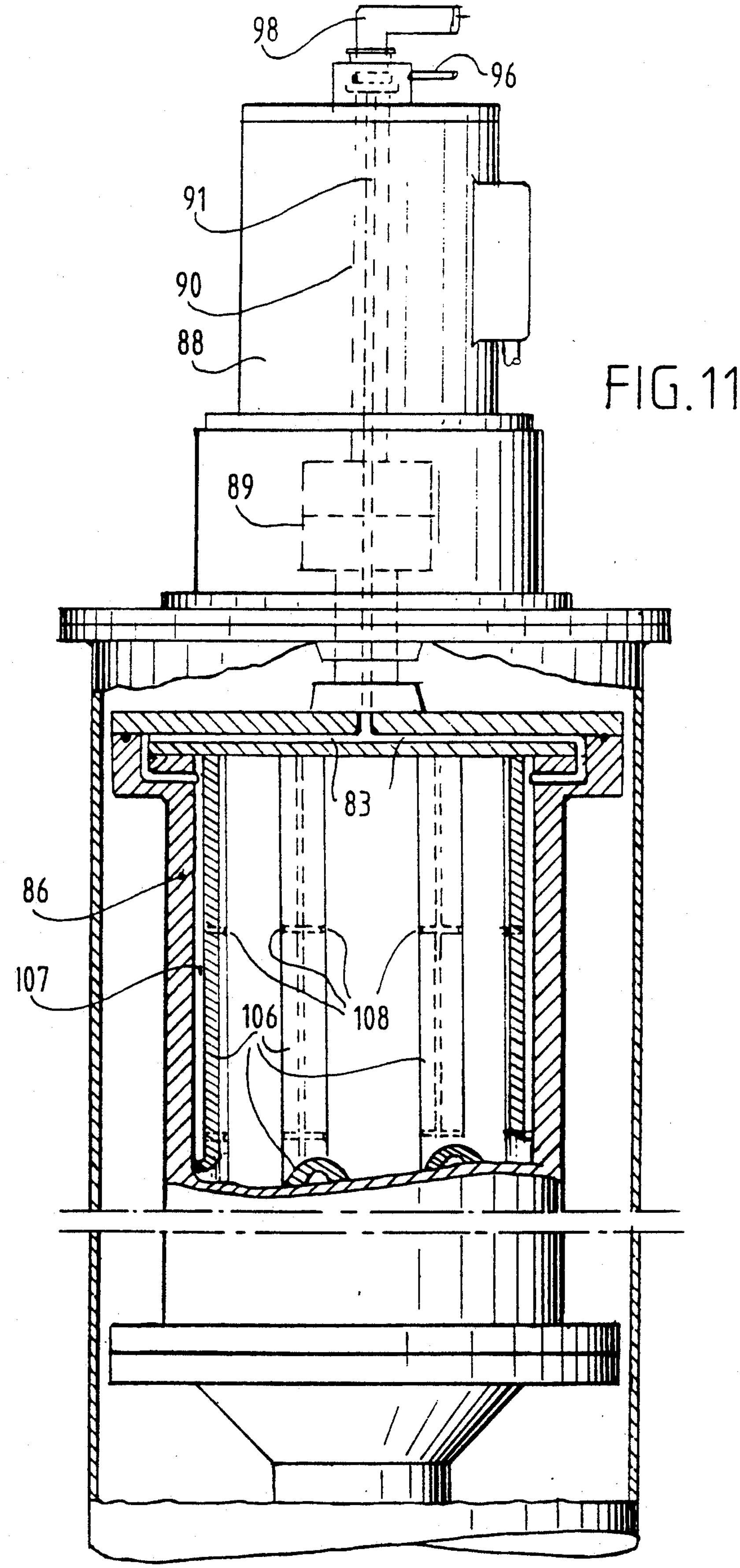
FIG. 11 is a view corresponding with FIG. 9 of another embodiment of the press-off means according to the invention.

The press-off means for pressing a deposit of separated constituents off the inner wall of the drum can be embodied in many ways other than as a lining of the inner drum as shown in FIG. 7-9. One of the further possibilities is indicated in FIG. 11. The components corresponding to FIG. 9 are designated in FIG. 11 with the same reference numerals. The pressing off the wall of the deposit takes place in the embodiment of FIG. 11 simply by blowing compressed air behind the deposit. This embodiment is therefore suitable for instance in those cases where the constituents for separating form a solid, closed, membrane-like layer. This is the case for instance in textile printing and dye works.

In order to feed the compressed air behind the deposit a number of strips 106, six in the embodiment shown, are fitted against the inner wall of the drum. These strips are provided in their surface lying against the inner wall of the drum 86 with a lengthwise groove 107 serving as air channel. Cut into the strips 106 at regular intervals are transverse channels 108 which debouch into the drum close to the inner wall thereof. During loosening compressed air is supplied via the connection 98 which is blown via the transverse channels 108 behind the deposit, thereby pressing it away from the inner wall of the drum 86.

It will be apparent that the control of the above described separator, particularly with regard to the operation of the valves 24, 25, the moving device 39, the motor 4, the control pressure from the source 103 and the like, can take place in a programmed form. The cycle duration can be determined empirically and be adhered to thereafter in a program. In accordance with the specific composition of the liquid for cleaning, a choice can be made of whether to use the spray orifices, the "inflatable" lining, repeated setting into rotation and braking of the drum and the like in order to achieve an optimal result. The devices described as embodiments therefore have many possibilities for being adapted such that a liquid waste flow of a specific composition can be optimally cleaned.

I claim:

1. A separator for separating relatively heavy constituents from a liquid composition containing said constituents and recovering a relatively clean liquid therefrom, said separator comprising:

a frame and a closed drum supported on said frame for rotation about a center line;

means for feeding a liquid composition into said drum;

drive means, operatively associated with said drum, for rotating a drum so as to separate liquid composition into said clean liquid and said constituents by depositing said constituents on an inner wall of said drum be centrifugal force and thus displacing said clean liquid in an annular layer situated radially inward of said constituents;

first discharge means, selectively connectable to said drum, for discharging said clean liquid from said drum;

second discharge means, selectively connectable to said drum, for discharging said constituents from said drum;

means for selectively connecting one of said first or second discharge means to said drum; and means for halting flow of liquid through said means for feeding and said first discharge means to result in capturing of a remaining liquid in said drum; and means for churning said remaining liquid so as to aid in removal of said constituents from said inner wall, said means for churning comprising braking means for exerting a braking moment on said drum.

2. A separator as claimed in claim 1, wherein:

said drive means comprises a motor reversible in drive rotation direction; and said braking means comprises means for reversing a direction of rotation of said motor.

3. A separator as claimed in claim 2, wherein the motor is an electrical DC-motor, and further comprising means, operatively associated with said device, for controlling operation of said motor.

4. A separator as claimed in claim 2, wherein a shaft of said motor comprises a channel means for supplying a medium under pressure to the press-off means.

5. A separator as claimed in claim 1, wherein the drum is provided internally with press-off means for pressing a deposit of separated constituents off the inner wall.

6. A separator as claimed in claim 5, wherein the press-off means comprise:

means for directing compressed air between said inner wall of the drum and said constituents deposited thereon.

7. A separator as claimed in claim 5, wherein the press-off means comprise:

a lining of flexible material in the drum and situated between said inner wall and said constituents and medium feed means for feeding a medium to an annular space between said inner wall and said lining in order to remove deposited constituents.

8. A separator as claimed in claim 7, wherein the medium feed means comprise a reservoir for air under pressure.

9. A separator as claimed in claim 1, and further comprising air supply means for feeding air under pressure into the drum.

10. A separator as claimed in claim 9, wherein the air supply means comprise pressure control means.

11. A separator as claimed in claim 1, and further comprising a stationary tube arranged coaxially in said drum, said stationary tube having spray orifice means for applying a fluid to an interior of said drum from said tube.

12. A separator as claimed in claim 11, wherein one end of the stationary tube is connected to the liquid feeding means and at the other end comprises an outflow opening of said liquid into said drum.

13. A separator as claimed in claim 11, wherein the stationary tube has concentric inner and outer walls each having outflow openings and spray orifices, and further comprising means for turning one of said inner and outer walls concentrically through an angle relative to the other between a first position in which corresponding outflow openings of both walls are aligned with each other and a second position in which corresponding spray orifices of both walls are aligned with each other.

14. A separator as claimed in claim 3, wherein:

said controlling means is programmable in order to change between forward and reverse modes of rotation of said motor briefly and successively, so as to alternately exert driving and braking forces thereon in order to effect said churning.

* * * * *